June 28, 1960

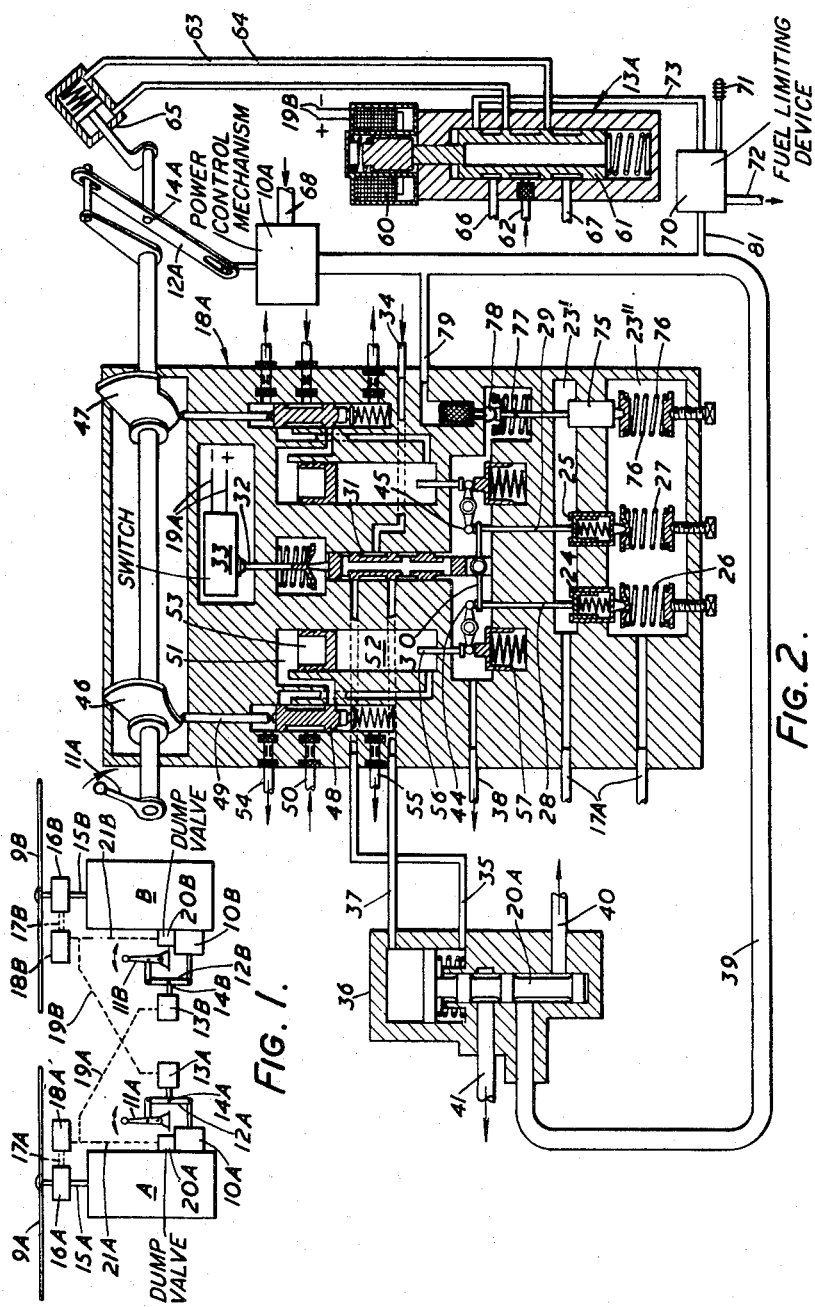

D. E. J. BUCKINGHAM
CONTROL SYSTEMS FOR POWER PLANTS HAVING
AT LEAST TWO POWER UNITS 2,942,416

Filed May 14, 1957

INVENTOR
DAVID E. J. BUCKINGHAM

BY *Watson, Cole, Grindle & Watson*

ATTORNEY

United States Patent Office 2,942,416
Patented June 28, 1960

2,942,416
CONTROL SYSTEMS FOR POWER PLANTS HAVING AT LEAST TWO POWER UNITS

David Edwin James Buckingham, London, England, assignor to D. Napier & Son Limited, London, England, a company of Great Britain Filed May 14, 1957, Ser. No. 659,059

Claims priority, application Great Britain May 14, 1956

6 Claims. (60—39.15)

This invention relates to control systems for power plants having at least two power units. It is an object of the invention to provide a control system which ensures that there will be a minimum reduction in total output in the event of failure of one or more (but not all) of the power units or the drive or drives therefrom.

The invention is concerned more specifically, but not exclusively, with power plants for multi-rotor helicopter aircraft, and for convenience the invention will be described in relation to this particular application although it will be appreciated that the principles involved are also applicable to power plants for other purposes. The invention provides a useful safety measure for a multi-rotor helicopter by minimizing the reduction in lift caused by the failure of a power unit or its drive in flight.

According to the present invention, a control system for a power plant having at least two power units comprises torque-sensing devices associated with the individual drives from each power unit, a power control mechanism for each power unit arranged to maintain the output of its power unit at a value determined by the setting of a control member, an override device for each power control mechanism adapted when operated to cause this power control mechanism to provide emergency power from its power unit irrespective of the setting of the control member, and cross connections between the torque-sensing device of each power unit and the override device of the (or each) other power unit, the arrangement being such that in the event of the torque from any power unit falling below a predetermined value the override device of the power control mechanism of the (or each) other power unit is automatically operated. Thus, if a power unit fails in flight the sudden reduction in torque therefrom is immediately sensed by the torque-sensing device of this power unit and the override device of the other power unit (or of each other power unit if there are more than two in the power plant, such power unit or units being herein referred to as the good power unit or units) is operated so that the good power unit or units will be automatically set to produce emergency power.

The arrangement should be such that the override device does not wholly eliminate control by the control member over the good power unit or units, but merely modifies the relationship between the control member and the power control mechanism of the good power unit or units so that the pilot retains control over the good power unit or units within the emergency power range.

It is also desirable, in the event of failure of a power unit or its drive, to shut down this power unit. For instance, if the power unit is a gas turbine unit and its power output shaft breaks, the power turbine may suddenly accelerate to a dangerously high speed unless the power unit is immediately shut down. In one form of the present invention each torque-sensing device is also connected to means for shutting down its own power unit (e.g., in the case of a gas turbine unit, a fuel cut-off valve and a dump valve) the arrangement being such that in the event of the torque from any power unit falling below the said predetermined value this power unit is automatically shut down.

Since these emergency actions should be initiated at the earliest possible moment in the event of a failure, it is desirable that the said predetermined value of the torque should be not much below the torque transmitted in normal operation. However, this would create difficulty if the power plant is required to operate at different output levels. To deal with this problem, means may be provided for rendering the torque-sensing devices insensitive to a fall in torque to the said predetermined value but sensitive to a fall in torque below a second predetermined value that is lower than the first-mentioned predetermined value. In normal operation the torque-sensing devices would remain sensitive to a fall in torque to the first-mentioned predetermined value, but when it is desired to run the power plant at a lower output level the said means for changing the sensitivity level of the torque-sensing devices will be operated. In order that this change in the sensitivity level of the torque-sensing devices can be performed automatically, the means for changing the sensitivity level of the torque-sensing devices may be connected to the control member so that it is operated whenever the control member is set for a power output below the normal output.

To permit starting and idling on the ground at torques below the said second predetermined value, when the aforementioned safety provisions are unnecessary, means may be provided for rendering the override devices inoperable. This can be done by putting the override devices themselves out of action, or by interrupting the interconnections between the torque-sensing devices and the override devices, or by putting the torque-sensing devices out of action.

Some power units, especially gas turbine units, include automatic devices for limiting the rate at which the fuel is admitted, to avoid overheating when the output is being increased under normal operating conditions. In an emergency however, risk of temporary overheating may be accepted in order that the emergency power output will be reached in the shortest possible time. For this purpose the override devices may be arranged, when operated, to put the automatic fuel limiting devices out of action or to up-rate their datum settings.

The invention may be performed in various ways, and one particular form of power plant embodying the invention and comprising a twin gas turbine power plant for a twin rotor helicopter will now be described by way of example with reference to the accompanying drawings, in which:

Figure 1 is a diagrammatic view showing certain major features of the power plant;

Figure 2 is a diagrammatic sectional view showing details of various parts;

Figure 3:
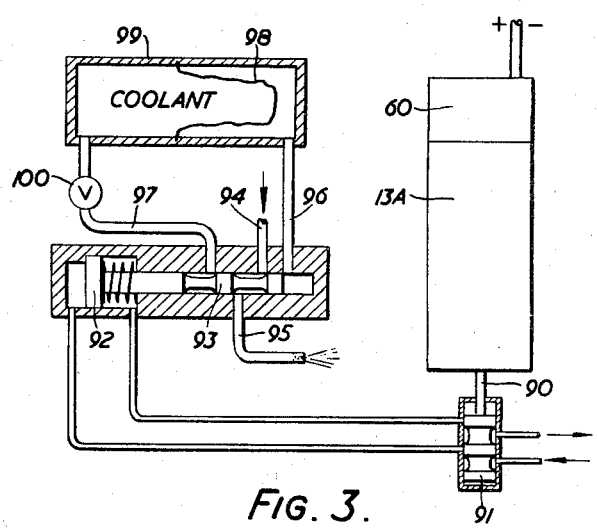
Figure 3 is a diagrammatic view showing optional means for coolant injection.

Referring to Figure 1, the helicopter power plant comprises a gas turbine power unit A which drives a helicopter rotor 9A and a gas turbine power unit B which drives another rotor 9B. Each power unit has its own power control mechanism 10A or 10B which can be independently controlled by the pilot by control members 11A, 11B through linkages 12A or 12B. The power control mechanisms can be of any type suitable for the power unit and need not be further described.

Associated with the linkages 12A and 12B there are override devices 13A and 13B which, when operated, respectively displace a fulcrum 14A and 14B in the appropriate linkage to alter the relationship between the corresponding control member and the power control mechanism from the normal operating relationshsip to an emergency relationship. In the emergency relationship any given setting of the control member produces a substantially higher power setting of the associated power control mechanism than when the normal relationship prevails. In the drive shafts 15A and 15B from the power units A and B to the rotors 9A and 9B respectively there are torque-sensing devices 16A and 16B respectively. The torque-sensing devices determine the hydraulic pressure difference in pairs of pipes 17A or 17B, as the case may be as a function of the torque being transmitted. Such devices are known in the art and need not be further described. The pipe pairs 17A and 17B communicate respectively with conversion units 18A and 18B. The conversion unit 18A is illustrated in detail in Figure 2 and will be described hereinafter. The conversion unit 18B is identical. The conversion unit 18A is sensitive to the pressure difference in the pipes 17A and is arranged so that if this pressure difference falls below a predetermined value indicative of a failure of the power unit A or of its drive, the conversion unit 18A brings the override device 13B of the power unit B into operation through a cross-connection 19A to set the engine B into its emergency power condition whereby the loss of power due to the failure of the power unit A is at least partially compensated by the additional power produced by the power unit B. Simultaneously the conversion unit 18A actuates a fuel cut-off and dump valve 20A associated with the power control mechanism of the power unit A to shut down this power unit. This actuation is effected through a connection 21A. The conversion unit 18B acts correspondingly in the event of failure of the power unit B, to set the power unit A into the emergency power condition through a cross-connection 19B and to shut down the power unit B through a connection 21B and a fuel cut-off and dump valve 20B.

The conversion units also perform certain other functions which will be referred to below in connection with Figure 2.

Referring now to Figure 2, the conversion unit 18A is indicated. This unit comprises two chambers 23' and 23" with which the pipes of the pair 17A respectively communicate, the pressure difference between the two chambers 23' and 23" thus being a function of the torque transmitted from the power unit A. Extending between the chambers 23' and 23" there are two telescopic pistons 24 and 25 which are acted on by adjustable springs 26 and 27 respectively. The spring 27 is stronger than the spring 26. The pistons 24 and 25 bear against push rods 28 and 29 which in turn bear on the opposite ends of a lever 30. The centre point of this lever is connected to a hydraulic valve 31 the upper end of which acts on the actuating rod 32 of an electric switch 33 connected by connections 19A (see also Figure 1) with a solenoid (not shown) adapted, when the switch 33 is closed, to operate the override device 13B of the power unit B. The hydraulic valve 31 controls the flow of a pressure fluid from a pipe 34 to a pipe 35 leading to a servomotor 36 controlling the fuel cut-off and dump valve 20A associated with the power unit A, and the escape of fluid from this servomotor through a pipe 37 to a low pressure drain pipe 38. The pipes 35 and 37 together constitute the connection denoted 21A in Figure 1. The piston of the servomotor 36 is normally in its lower position as shown so that the fuel cut-off and dump valve 20A is also in the position shown whereby metered fuel can flow freely from an inlet pipe 39 leading from the power control mechanism 10A to a delivery pipe 40 leading to burners in the power unit A. When the piston of the servomotor 36 is in its upper position the valve 20A is raised and shuts off communication between the pipes 39 and 40 and causes the fuel supplied through the inlet pipe 39 to be dumped through a pipe 41.

A lock-out mechanism is provided for each of the pistons 24 and 25, comprising stops 44 and 45 respectively, which when in the operative positions as shown in Figure 2 bear on the ends of the lever 30 and hold this lever immovable. The lock-out mechanisms are controlled by cams 46 and 47 actuated by the control member 11A. The two lock-out mechanisms are identical, apart from the cams, and it will be sufficient to describe one only, namely the left-hand mechanism including the stop 44. The cam 46 acts on a spring-loaded valve 48 through a push rod 49. This valve controls the inflow of pressure fluid from a restricted pipe 50 to spaces 51 and 52 above and below a piston 53, and the outflow of fluid from these spaces through restricted low pressure drain pipes 54 and 55. When the valve 48 is in its upper position as shown the piston 53 is in a raised position. On the other hand, when the control member 11A is in a position in which the lobe of the cam 46 is in contact with the push rod 49 the piston 53 is in a lowered position in which it depresses a push rod 56 against the action of a spring 57 to raise the stop 44 well clear of the lever 30. The stop 45 is similarly controlled by the cam 47. The restrictors in the pipes 50, 54, and 55, and in the corresponding pipes of the right-hand lock-out mechanism, are selected to provide a suitable time delay in the movements of the piston 53 and the corresponding right-hand piston in response to movements of the control member 11A. The system as so far described works as follows—

In normal flight both the stops 44 and 45 are in their inoperative positions since the control member 11A occupies a range in which the lobes of both cams 46 and 47 are in contact with their respective push rods. Also the torque transmitted by the power unit A is such that the pressure difference between the chambers 23' and 23" keeps both the pistons 24 and 25 depressed against the action of the springs 26 and 27. The valve 31 is therefore in its lowest position, the switch 33 is open so that the override device 13B of the power unit B is inoperative and fuel cut-off and dump valve 20A is in its normal position. If now there should be a failure of the power unit A or its drive shaft 15A, the torque-sensitive device 16A will immediately lower the pressure difference between the chambers 23' and 23". As this pressure difference falls the springs 26 and 27 extend, the spring 27 extending faster than the spring 26 since it is stronger. The pistons 24 and 25 rise, the latter rising more than the former and tilting the lever 30 counterclockwise and so raising the valve 31. At a predetermined intermediate value of the transmitted torque, which is only a little below the lowest torque normally transmitted in normal flight the valve 31 will have been raised sufficiently to close the switch 33, thereby actuating the override device 13B to put the power unit B into the emergency power condition. It also actuates the servomotor 36 to raise the valve 20A which cuts off the supply of fuel from the power unit A and dumps the fuel which is still being supplied through the power control mechanism 10A.

When the piston 25 is locked out of operation by means of the stop 45 the piston 24 will produce a like operation of the control system, but only when the pressure difference between the chambers 23' and 23" has dropped to a considerably lower value that that at which the system would be operated by means of the piston 25, namely to a value corresponding to a predetermined low torque only a little below the lowest torque normally transmitted when the power unit is in a "throttle-back" condition.

The lobe of the cam 47 is so disposed that the piston 25 is locked out of operation by means of the stop 45 at all settings of the control member 11A below that corresponding to the said intermediate torque at which the control system would be operated by the piston 25 in normal flight. This is to prevent operation of the control system when the torque falls below this intermediate value due to a deliberate movement of the control lever into a low-to-intermediate torque region, for example for flight in a "throttled back" condition, as distinct from a drop in torque to the said intermediate value due to a mechanical failure.

The lobe of the cam 46 is so disposed that the piston 24 is locked out of operation by means of the stop 44 at settings of the control member 11A corresponding to the idling range at which the torque delivered by the power unit A is so low that otherwise the control system would be operated by the piston 24. This is to prevent operation of the control system when the torque falls below this low value due to a deliberate movement of the control lever into the idling range, as distinct from a drop in torque to this low value due to a mechanical failure.

Similar events will occur in the corresponding parts of the power unit B in the event of failure of that power or its shaft 15B. The actuation of the conversion unit 18B of that power unit not only operates the fuel cut-off and dump valve 20B of that power unit but also operates the override device 13A of the power unit A. This device is shown in more detail in Figure 2. It comprises a solenoid 60 which is energised through the connection 19B on actuation of the conversion unit 18B of the power unit B. This solenoid controls a hydraulic valve 61 which in turn controls the admission of a pressure fluid from a pipe 62 to pipes 63 or 64 leading respectively to spaces above and below the piston of a servomotor 65, and the discharge of fluid from these spaces through the pipes 63 or 64 to pipes 66 or 67 which are maintained at an intermediate back pressure. The servomotor 65 adjusts the position of the fulcrum 14A in the linkage 12A between the control member 11A and the power control mechanism 10A, whereby on actuation of the override device 13A the relationship between the setting of the control member 11A and the flow of fuel through the power control mechanism 10A from a supply pipe 68 to the pipe 39 is changed from the normal relationship to an emergency relationship. In this emergency relationship the amount of fuel passing to the power unit A at any given setting of the control member 11A is substantially in excess of the normal amount. The override device 13B of the power unit B is identical to the override device 13A.

Figure 4:
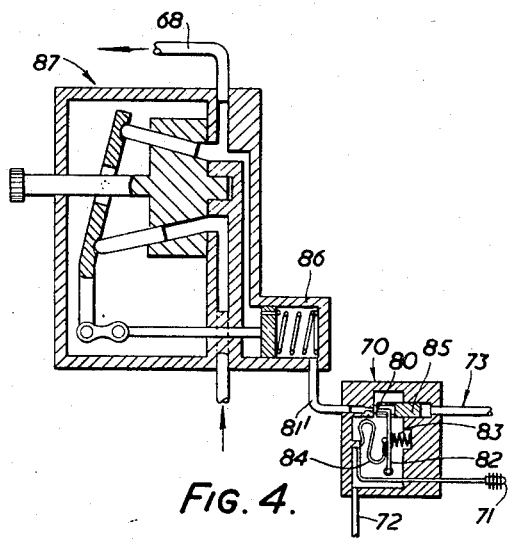
Figure 4 shows an alternative arrangement whereby the automatic fuel limiting device acts on a variable stroke fuel pump.

To avoid overheating the power units they are provided with automatic fuel limiting devices actuated in response to the turbine inlet temperature. This device for the power unit A is shown in Figure 2 at 70, which is illustrated in detail in Figure 4. The device comprises a half ball bleed valve 80 which controls bleed of fuel from a pipe 81 (Figure 2) or 81' (Figure 4), to a drain pipe 72. The half ball of the bleed valve is acted on by a lever 82 urged in one direction by a spring 83 and in the opposite direction by a Bourdon tube 84 the pressure in which is determined by the turbine inlet temperature sensed by a temperature-sensitive head 71 exposed to turbine inlet temperature. This temperature therefore controls the bleed valve 80 so that the bleed valve 80, when the turbine inlet temperature approaches its maximum value, bleeds fuel from the pipe 81 or 81'. During emergency power conditions, which are only experienced rarely and then for only short periods, abnormally high turbine inlet temperature is permissible. Accordingly, when the override device 13A is operated the valve 61 puts a pipe 73 into communication with the medium pressure pipe 66, thereby applying a pressure to a piston 85 which acts on the bleed valve in the device 70 to hold this valve closed. In the arrangement shown in Figure 2 the automatic fuel limiting device 70 controls the turbine inlet temperature by bleeding metered fuel from the pipe 39 through the pipes 81 and 72. In the alternative arrangement shown in Figure 4 the automatic fuel limiting device 70 bleeds fuel from a servo motor 86, which controls the stroke of a variable-stroke fuel pump 87 of conventional swashplate design, thereby varying the delivery of fuel from this fuel pump into the fuel supply pipe 68.

The conversion unit 18A also includes a maximum torque limiting device. This comprises a piston 75 extending between the chambers 23' and 23" and urged upwardly by an adjustable spring 76. The piston 75 carries a rod 77 which normally holds closed a bleed valve 78. In the event of the transmitted torque attaining an upper limit, the pressure difference between the chambers 23' and 23" becomes sufficient to depress the piston 75, thereby releasing the bleed valve 78 and permitting metered fuel to escape from the pipe 39 through a pipe 79, thereby reducing the amount of fuel supplied to the power unit A.

To minimize the danger of overheating of a power unit which is set to emergency power conditions, provision may be made for injecting a coolant into any power unit that is set to produce emergency power. One arrangement for doing this is illustrated in Figure 3. In the arrangement the hydraulic valve of the override device 13A is provided with a downward extension 90, which, when the solenoid 60 is energized, moves a control valve 91 from the position shown in the drawing into an upper position. In the position of the valve 91 shown in the drawing, a servo motor piston 92 controlled by the valve 91 is in its left-hand end position in which a valve 93 establishes communication between a pipe 94 leading from a source of compressed air, for instance an air compressor of the power unit, and a coolant injector pipe 95. On the other hand, when the valve 91 is raised by energization of solenoid 60, the servo motor piston 92 is forced to the right, thereby moving the valve 93 to the right also, establishing communication between the pipe 94 and a pipe 96, and between a pipe 97 and the coolant injection pipe 95. Pipe 96 leads to an air space on the right-hand side of a bag-type diaphragm 98 contained in a coolant chamber 99, the space to the left of the diaphragm containing coolant. Pipe 97 communicates with this left-hand space so that when air pressure enters the right-hand space from pipe 94 through pipe 96 the pressure forces coolant out of the left-hand space through the pipe 97 and through the coolant injection pipe 95. Pipe 97 contains a control valve 100 for regulating the coolant supply, this valve preferably being controlled automatically to adjust the rate of coolant supply to the prevailing rate of fuel injection.

What I claim as my invention and desire to secure by Letters Patent is:

1. A control system for a power plant having a first power unit, a second power unit, a first drive shaft connected to said first power unit and a second drive shaft connected to said second power unit, said control system comprising first and second torque-sensing devices associated respectively with said first and second drive shafts, first and second control members for said first and second power units respectively, first and second power control mechanisms for said first and second power units respectively, each of said power control mechanisms being adapted to maintain the power output of its respective power unit at a value determined by the setting of the respective control member, first and second override devices for said first and second power control mechanisms respectively, each of said override devices having an operative position in which the respective power control mechanism provides emergency power from its respective control member, said emergency power being greater than the normal power at the same setting of respective control member, a connection between said first torque-sensing device and said second override device adapted to set said second override device in said operative position in the event of said first torque-sensing device sensing a torque below a predetermined value, and a connection between said second torque-sensing device and said first override device adapted to set said first override device in said operative position in the event of said second torque-sensing device sensing a torque below a predetermined value.

2. A control system according to claim 1 in which each of said first and second power control mechanisms includes a shut-down device having an operative position in which the respective power unit is shut down, and in which there is an operative connection between said first torque-sensing device and the shut-down device of said first power control mechanism, and an operative connection between said second torque-sensing device and the shut-down device of said second power control mechanism, each of said operative connections being adapted to set the respective shut-down device in its operative position in the event of the respective torque-sensing device sensing a torque below said predetermined value.

3. A control system according to claim 1 in which each of said power control mechanisms includes an automatic limiting device to limit the rate at which fuel can be admitted to the respective power unit during acceleration with the respective override device inoperative, and a connection between said respective override device and said automatic limiting device operative to neutralize said automatic limiting device when said respective override device is in its operative position.

4. A control system according to claim 1 including means for rendering said override devices inoperable.

5. A control system according to claim 1 for a power plant in which each of said power units is provided with means for injecting a coolant at high power outputs, means for controlling said coolant injection, and an operative connection between said coolant injection control means and the override device associated with said power unit.

6. A control system according to claim 1 comprising also selector means for each power unit, an operative connection between the control member of each power unit and said selector means, an operative connection between said selector means and the torque-sensing device of each power unit, said selector means having one position in which said torque-sensing device is sensitive to a fall in torque to said predetermined value and another position in which said torque-sensing device is insensitive to a fall in torque to said predetermined value but is sensitive to a fall in torque to a lower predetermined value.

References Cited in the file of this patent
FOREIGN PATENTS
617,729   Great Britain _____ Feb. 10, 1949